United States Patent [19]

McCracken

[11] 4,078,277
[45] Mar. 14, 1978

[54] GUY WIRE CLAMP

[76] Inventor: Lester C. McCracken, 5307 S. 364, Auburn, Wash. 98002

[21] Appl. No.: 487,520

[22] Filed: Aug. 8, 1974

[51] Int. Cl.² .................. F16G 11/00; E04H 12/24
[52] U.S. Cl. .................. 24/115 R; 24/136 A; 174/45 R; 403/211; 24/263 R
[58] Field of Search ............. 24/81 R, 81 A, 81 AA, 24/81 AC, 81 AD, 81 G, DIG. 21, 115 B, 136 B, 265 EE, 136 A, 134, 263 DP, 263 DD, 263 DS, 230.5 TH, 81 BA; 211/119.1, 119.01; 52/148, 149, 223 R; 403/211; 248/61, 70; 174/407 D, 43, 45 TD, 40 R, 45 R

[56] References Cited

U.S. PATENT DOCUMENTS

| | | | |
|---|---|---|---|
| 461,069 | 10/1891 | Caspar | 24/81 G |
| 939,618 | 11/1909 | Neller et al. | 52/149 |
| 1,216,531 | 2/1917 | Wolf | 24/81 BA X |
| 1,283,511 | 11/1918 | Heidtmann | 24/81 BA UX |
| 1,297,187 | 3/1919 | Lamb | 403/211 |
| 1,618,901 | 2/1927 | Woolman | 24/136 A |
| 2,153,035 | 4/1939 | Burt | 24/263 DD UX |
| 2,239,964 | 4/1941 | Hoffert | 24/263 DP UX |
| 2,296,567 | 9/1942 | Nielsen | 403/211 |
| 2,834,081 | 5/1958 | Stump | 24/263 DD X |
| 2,834,186 | 5/1958 | Frerichs et al. | 24/230.5 TH X |
| 3,058,386 | 10/1962 | Morrow | 24/136 B |
| 3,399,269 | 8/1968 | Willox | 174/45 R |
| 3,647,184 | 3/1972 | Vanderhurst et al. | 52/223 R |
| 3,766,610 | 10/1973 | Thorsbakken | 403/211 |

FOREIGN PATENT DOCUMENTS

| | | | |
|---|---|---|---|
| 1,054,523 | 4/1959 | Germany | 174/45 R |
| 276,525 | 9/1927 | United Kingdom | 24/136 A |

*Primary Examiner*—Donald A. Griffin
*Attorney, Agent, or Firm*—Charles L. Kratt, II

[57] ABSTRACT

The clamp, operable to compressively lock a wire, comprises a casing having a cone-shaped cavity therethrough, and means engaging the cavity about the wire, the means gripping the wire as a result of constriction of the cone-shaped cavity as a result of loads applied to the wire.

4 Claims, 5 Drawing Figures

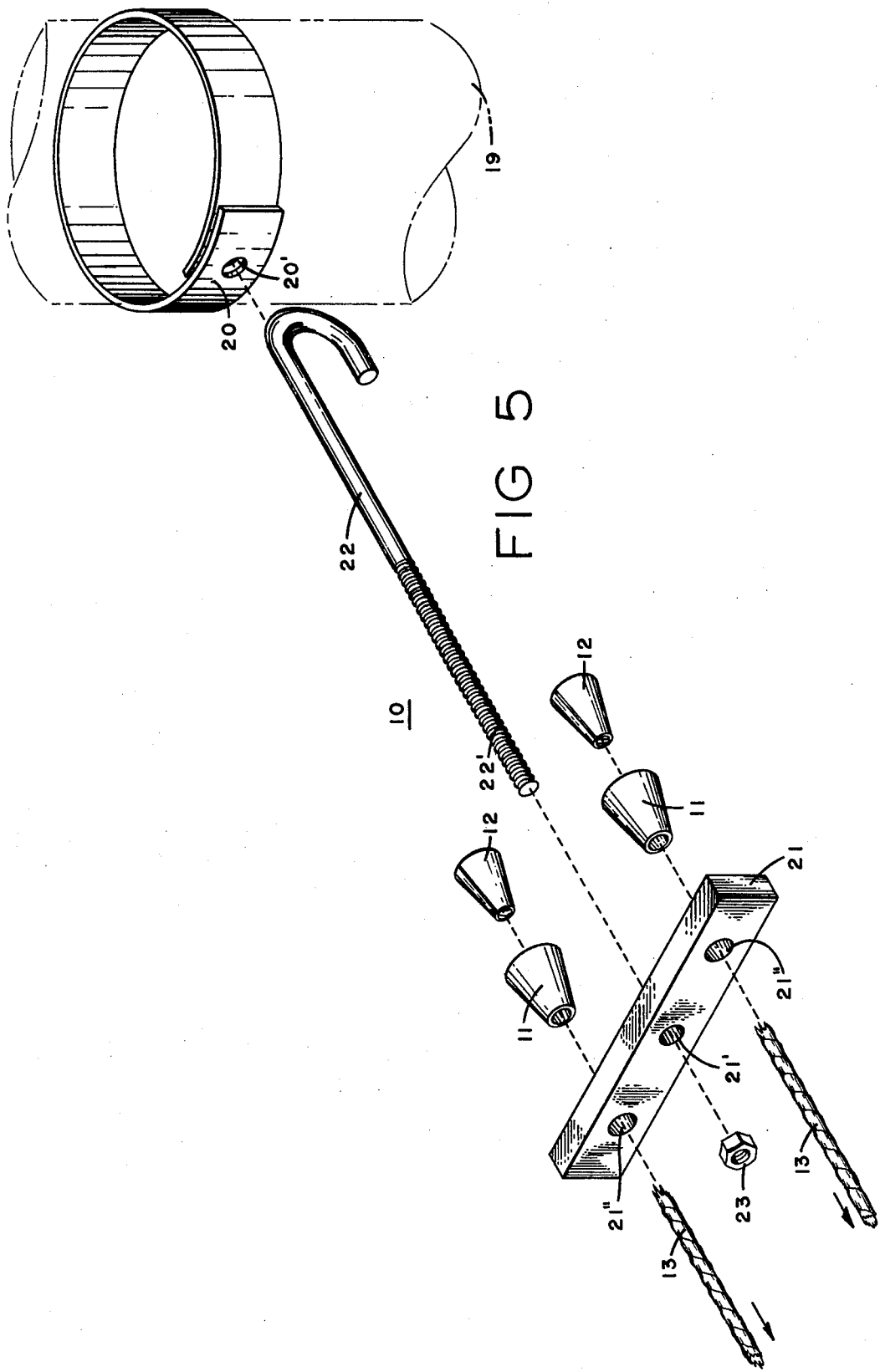

GUY WIRE CLAMP

FIELD OF INVENTION

The present invention relates to a wire clamp, and more particularly to a self-tightening wire clamp.

BACKGROUND OF INVENTION

Wire clamps of the prior art may be characterized as being of the jaw-type compressive clamps, or crushable fastener-type jaws. Jaw-type clamps have had the characteristic of being difficult to manipulate and have tended to cut cable at high loads. Crushable clamps include fasteners which employ an annular ring which is crushed by the cable at high loads. Because of the nature of their installation, crushable clamps are inherently defective at high loads, and their installation must be made with great care to insure that the clamp is crushed uniformly about the cable surface.

Accordingly, it is an object of the present invention to provide an improved wire clamp which is self-tightening and which applies gripping force uniformly about the circumference of the cable.

It is an object of the present invention that the present wire clamp be adaptable to a variety of wire fastening applications, such as for guy wires, electrical wires, and the like.

It is a still further object of this invention that the present wire clamp be adaptable to various jaw types, including semicircular jaws and ball-jaws.

These and other objects shall become apparent from the description following, it being understood that modifications may be made without affecting the teachings of the invention here set out.

SUMMARY OF INVENTION

The clamp, operable to compressively lock a wire, comprises a casing having a cone-shaped cavity therethrough, and means engaging the cavity about the wire, the means gripping the wire as a result of construction of the cone-shaped cavity as a result of loads applied to the wire. Means engaging may include cone or ball jaws. The clamp may be employed in a guy wire kit designed for features of the present clamp.

A more thorough and comprehensive understanding may be had from the detailed description of the preferred embodiment when read in connection with the drawings forming a part of this specification.

BRIEF DESCRIPTION OF THE DRAWINGS

FIG. 5 is an exploded view of the guy wire kit employing the wire clamps of the present invention.

DETAILED DESCRIPTION OF THE PREFERRED EMBODIMENT

Figure 1:
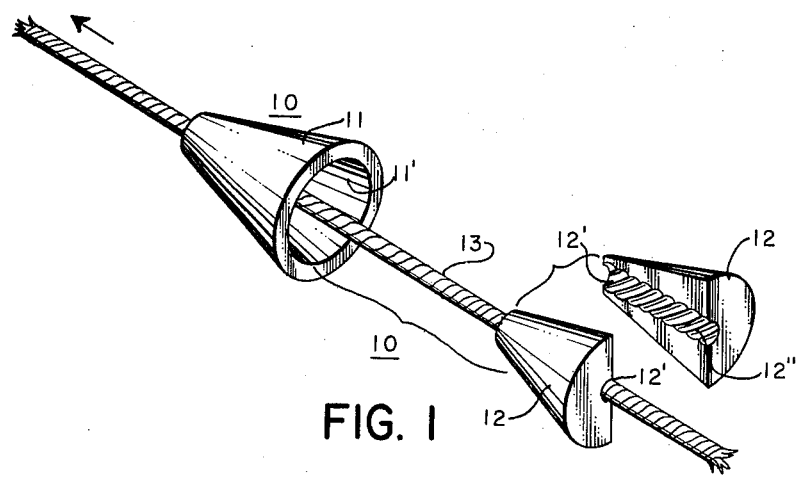
FIG. 1 is an exploded view of the wire clamp of this invention.
Figures 2, 3:
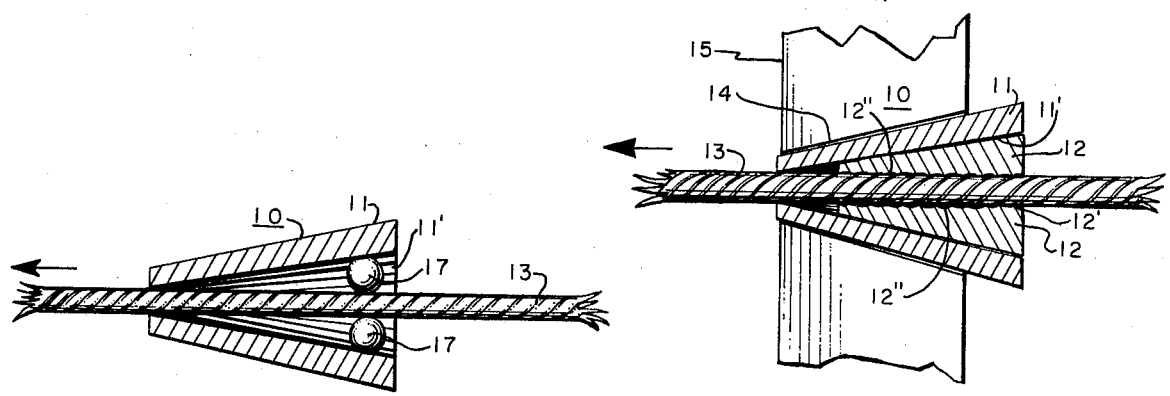
FIG. 2 is a longitudinal cross-section view of the apparatus of the FIG. 1 shown with the jaws engaged with the casing.
FIG. 3 is a cross-sectional view of a further embodiment of the wire clamp.

Referring now to the drawings and more particularly to the FIGS. 1 and 2, the wire clamp of this invention is shown to advantage and generally identified by the numeral 10. The clamp 10 comprises a casing 11 having a cone-shaped cavity 11' and jaws 12 operable to engage walls of the cavity 11' about a wire 13. The jaws 12 may have a transversely curved and longitudinally tapered configuration which together forms a cone, which contiguously engages cone-shaped walls of the cavity 11'. The interior walls at which the jaws 12 mate are each provided with a central rectilinear groove 12' which together are nominally smaller than the diameter of the wire 13. It has been found to advantage to fabricate the jaws 12 by forming a cone-shaped member, drilling the member rectilinearly to form the grooves 12', and then to cut the cone rectilinearly in half. Of course, three jaws 12 may be formed by rectilinearly cutting a cone-shaped section into three portions.

In operation, the wire 13 is threaded through the casing 11 with the apex thereof in the direction of loads (as shown by the vector line). The jaw grooves 12' may be provided with knurling 12" operable to conform to the wire-like rope wire 13. The casing 11 may be disposed in the hole 14 of a flange 15 which is secured to a deadman (not shown). The hole 14 may be of any size or configuration sufficient to retain outer walls of the casing 11. It may also be seen that a casing 11 may be provided in a structural member by providing the cone-shaped cavity 11' in the structural member itself. The clamp 10 may secure cable, wire, sheathed wire, and the like.

Referring to the FIG. 3, a further embodiment of the clamp 10 comprises a casing 11 identical to that described above, and a plurality of ball-jaws 17. The jaws 17 are of a size suitable to be inserted into the cavity 11' about the wire 13. It has been found to advantage to fabricate the ball-jaws 17 of a semiductible material such as copper, aluminum, zinc or the like, to insure that the jaws 17 will grip with the wire 13. The ball-jaws 17 may also be provided with suitable knurling (not shown).

In operation, the wire 13 is threaded as set out above. A pair or more usually three, ball-jaws 17 are inserted into the cavity 11' without the wire 13, and the wire 13 is caused to draw the casing 11 and jaws 17 together.

It is to be understood that the present wire clamp 10 is operable in various electrical applications, such as tie downs, tie down terminals, and the like. Elements of the wire clamp 10 may be insulated or not according to requirements of the particular application.

Figure 4:
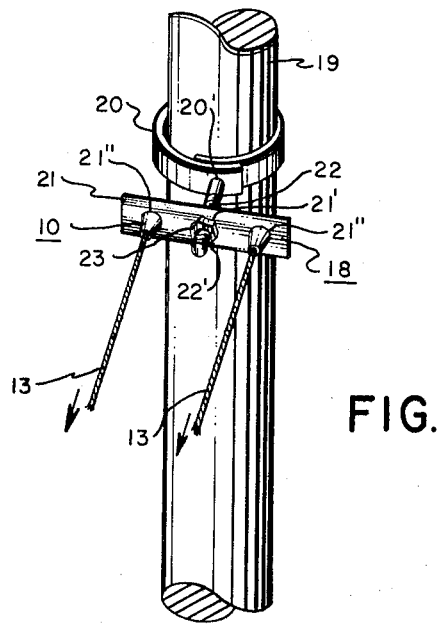
FIG. 4 is a top perspective view of a guy wire kit employing wire clamps of the present invention.

Referring to the FIG. 4, the wire clamp 10 may be employed in a wire guide kit 18 for securing a mast 19. The kit 18 comprises a mast strap 20, crosstree 21 secured to the mast strap 20 by a turnbuckle 22 and the clamps 10. The strap 20 may be a strip having a pair of overlapping holes 20'. The crosstree 21 is a plate-like member having a central turnbuckle receiving hole 21' and a pair of clamp receiving holes 21" disposed distally from each of the terminal ends of the crosstree 21. The bolt 22 is a substantially J-shaped member having a threaded shaft portion 22'. The kit 18 is assembled by disposing a suitably sized strap 20 about a mast 19 and securing it with the hook or "J" portion of the bolt 22. The crosstree 21 is then engaged through the hole 21' and secured thereto to a nut 23. Cables 13 may be threaded through the holes 21" of the crosstree 21, and the clamps 10 may be engaged distally from their rearwardmost terminal ends engaged through the crosstree 21, and the casings 11 engaged with the holes 21". The cables 13 may then be tightened at the crosstree 21 by tightening the nut 23 on the turnbuckle 22.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A guy wire clamp comprising a strap for engaging the outer circumference of a mast, said strap having apertured overlapping end portions; a hook shaped bolt threaded on its shaft, the hooked portion of the bolt engaging the apertures of said strap when said strap is suitably engaged about said mast; a crosstree having a means for receiving said thread shaft of said bolt; there being at least one other aperture in said crosstree dimensioned to receive a cone-shaped casing having a cone-shaped cavity therethrough to receive a portion of a guy wire therein, means engaging said cavity about said wire, said means gripping said wire as a result of constriction of said cone-shaped cavity as result of loads applied to said wire.

2. The apparatus of claim 1 wherein each of said pair of clamps is a clamp operable to compressively lock a wire, comprising a casing having a cone-shaped cavity therethrough; and means engaging said cavity about said wire, said means gripping said wire as a result of constriction of said cone-shaped cavity as result of loads applied to said wire.

3. The articles of claim 1 wherein said means for engaging said cavity and said wire are jaws which together form a cone-shaped member being cut rectilinearly into sections, said sections having a central rectilinear groove.

4. The article of claim 1 wherein said means for engaging said cavity and said wire are ball jaws of a diameter which are engageable into said cavity about said wire.

* * * * *